United States Patent
Kimes et al.

(10) Patent No.: US 8,007,396 B2
(45) Date of Patent: Aug. 30, 2011

(54) PLANETARY TRANSMISSION HAVING COMMON CARRIER FOR GENERATING SIX FORWARD AND TWO REVERSE DRIVE RATIOS

(75) Inventors: John William Kimes, Wayne, MI (US); Mark William Rosselot, Saline, MI (US); Gregory Daniel Goleski, Rochester Hills, MI (US); Gregory Dean Gardner, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 554 days.

(21) Appl. No.: 12/197,757

(22) Filed: Aug. 25, 2008

(65) Prior Publication Data
US 2010/0044141 A1 Feb. 25, 2010

(51) Int. Cl.
*F16H 3/62* (2006.01)
(52) U.S. Cl. .......................................... 475/276; 475/903
(58) Field of Classification Search ......................... None
See application file for complete search history.

(56) References Cited

U.S. PATENT DOCUMENTS

| | | | |
|---|---|---|---|
| 487,615 A | 12/1892 | Frazeur | |
| 4,224,838 A * | 9/1980 | Roushdy et al. | 475/55 |
| 4,229,996 A | 10/1980 | Hildebrand | |
| 5,156,575 A | 10/1992 | Garrett | |
| 5,295,924 A | 3/1994 | Beim | |
| 5,429,557 A * | 7/1995 | Beim | 475/283 |
| 5,435,792 A | 7/1995 | Justice et al. | |
| 5,503,605 A | 4/1996 | Beim | |
| 5,593,357 A | 1/1997 | Justice et al. | |
| 5,919,111 A | 7/1999 | Park | |
| 5,993,347 A * | 11/1999 | Park | 475/280 |
| 6,083,135 A | 7/2000 | Baldwin et al. | |
| 6,217,474 B1 | 4/2001 | Ross et al. | |
| 6,736,750 B1 | 5/2004 | Lee et al. | |
| 6,743,139 B1 | 6/2004 | Usoro et al. | |
| 6,905,435 B2 | 6/2005 | Nielsen | |
| 7,059,994 B2 | 6/2006 | Usoro et al. | |
| 7,066,861 B2 | 6/2006 | Bucknor et al. | |
| 7,090,610 B2 | 8/2006 | Usoro et al. | |
| 7,104,914 B2 | 9/2006 | Bucknor et al. | |
| 7,803,082 B2 * | 9/2010 | Diosi et al. | 475/275 |

* cited by examiner

*Primary Examiner* — Dirk Wright
(74) *Attorney, Agent, or Firm* — Diederiks & Whitelaw, PLC

(57) ABSTRACT

An automatic transmission includes a first planetary gearset having a first planet pinion set rotatably supported on a common carrier and drivingly engaged with a first sun gear and a first composite gear that acts both as a first ring gear and a second sun gear. A second planetary gearset includes a second planetary pinion set rotatably supported on the common carrier and drivingly engaged with a third sun gear, the first composite gear and a second composite gear that acts both as a second ring gear and a third ring gear. A third planetary gearset has a third planet pinion set rotatably supported on the common carrier and drivingly engaged with a third sun gear and the second composite gear. A series of nested clutches and multiple bakes are employed to establish six forward speed ratios and one reverse ratio using a single carrier.

21 Claims, 5 Drawing Sheets

FIG. 3

| | C 1234 | B 26 | B 35 | C 456 | BR1 | CR | IDEAL TORQUE RATIO | STEP |
|---|---|---|---|---|---|---|---|---|
| Rev | | | | | x | x | -B3 | 128% |
| 1st | x | | | | x | | B1B2 | |
| 2nd | x | x | | | | | (B1+1)B2/[(B2+1)] | 1.73 |
| 3rd | | | x | | | | (B1B2+B3)/[(B3+1)] | 1.57 |
| 4th | | | | x | | | 1 | 1.49 |
| 5th | | | x | x | | | B3/[(B3+1)] | 1.19 |
| 6th | | x | | x | | | B2/[(B2+1)] | 1.50 |

FIG. 4A

Element Speeds

|  | Sun1 | Carrier1 | Ring1 | Planet1 | Sun2 | Carrier2 | Ring2 | Planet2 | Sun3 | Carrier3 | Ring3 | Planet3 |
|---|---|---|---|---|---|---|---|---|---|---|---|---|
| Rev. | -0.780 | 0.000 | 0.244 | 0.711 | 0.244 | 0.000 | -0.193 | -1.824 | 1.000 | 0.000 | -0.193 | -0.477 |
| 1st | 1.000 | 0.000 | -0.313 | -0.911 | -0.313 | 0.000 | 0.247 | 2.338 | -1.282 | 0.000 | 0.247 | 0.612 |
| 2nd | 1.000 | 0.238 | 0.000 | -0.694 | 0.000 | 0.238 | 0.426 | 1.781 | -0.738 | 0.238 | 0.426 | 0.466 |
| 3rd | 1.000 | 0.562 | 0.425 | -0.399 | 0.425 | 0.562 | 0.670 | 1.025 | 0.000 | 0.562 | 0.670 | 0.268 |
| 4th | 1.000 | 1.000 | 1.000 | 0.000 | 1.000 | 1.000 | 1.000 | 0.000 | 1.000 | 1.000 | 1.000 | 0.000 |
| 5th | 1.780 | 1.000 | 0.756 | -0.711 | 0.756 | 1.000 | 1.193 | 1.824 | 0.000 | 1.000 | 1.193 | 0.477 |
| 6th | 4.195 | 1.000 | 0.000 | -2.911 | 0.000 | 1.000 | 1.789 | 7.471 | -3.097 | 1.000 | 1.789 | 1.954 |

FIG. 4B

Element Torques

|  | Sun1 | Carrier1 | Ring1 | Sun2 | Carrier2 | Ring2 | Sun3 | Carrier3 | Ring3 |
|---|---|---|---|---|---|---|---|---|---|
| Rev | 0.000 | 0.000 | 0.000 | 0.000 | 0.000 | 0.000 | 1.000 | -6.194 | 5.194 |
| 1st | 1.000 | -4.195 | 3.195 | -3.195 | 7.246 | -4.051 | 0.000 | 0.000 | 0.000 |
| 2nd | 1.000 | -4.195 | 3.195 | -1.850 | 4.195 | -2.345 | 0.493 | -3.051 | 2.558 |
| 3rd | 1.000 | -4.195 | 3.195 | -3.195 | 7.246 | -4.051 | 0.000 | 0.000 | 0.000 |
| 4th | 0.247 | -1.036 | 0.789 | -0.789 | 1.789 | -1.000 | 0.000 | 0.000 | 0.000 |
| 5th | 0.000 | 0.000 | 0.000 | 0.000 | 0.000 | 0.000 | -0.161 | 1.000 | -0.839 |
| 6th | 0.000 | 0.000 | 0.000 | -0.441 | 1.000 | -0.559 | 0.000 | 0.000 | 0.000 |

FIG. 4C

| | C1234 | B26 | B35 | C456 | BR1 | CR |
|---|---|---|---|---|---|---|
| Rev | -1.780 | 0.244 | 1.000 | -1.000 | 0.000 | 0.000 |
| 1st | 0.000 | -0.313 | -1.282 | -1.000 | 0.000 | -2.282 |
| 2nd | 0.000 | 0.000 | -0.738 | -0.762 | 0.238 | -1.738 |
| 3rd | 0.000 | 0.425 | 0.000 | -0.438 | 0.562 | -1.000 |
| 4th | 0.000 | 1.000 | 1.000 | 0.000 | 1.000 | 0.000 |
| 5th | 0.780 | 0.756 | 0.000 | 0.000 | 1.000 | -1.000 |
| 6th | 3.195 | 0.000 | -3.097 | 0.000 | 1.000 | -4.097 |

Clutch Speeds

FIG. 4D

| | C1234 | B26 | B35 | C456 | BR1 | CR |
|---|---|---|---|---|---|---|
| Rev | | | | | -6.194 | 1.000 |
| 1st | 1.000 | | | | 3.051 | |
| 2nd | 1.000 | 1.345 | | | | |
| 3rd | 1.000 | | 0.493 | | | |
| 4th | 0.247 | | | 0.753 | | |
| 5th | | | -0.161 | 1.000 | | |
| 6th | | -0.441 | | 1.000 | | |
| max | 1.000 | 1.345 | 0.493 | 1.000 | 6.194 | 1.000 |

Clutch Torques

PLANETARY TRANSMISSION HAVING COMMON CARRIER FOR GENERATING SIX FORWARD AND TWO REVERSE DRIVE RATIOS

FIELD OF INVENTION

The present invention pertains to the field of automatic transmissions for motor vehicles and, more particularly, to a kinematic arrangement of planetary gearing and clutches for a transmission.

BACKGROUND OF THE INVENTION

Planetary gearsets are employed in various automatic transmissions to produce multiple gear ratios by selectively engaging and disengaging clutches used to connect and release connections among various gearset components. Additional gear ratios are also achieved by selectively engaging and disengaging brakes, which hold selective gearset components against rotation or release them for rotation. Generally, as the number of speed ratios produced by the transmission increases, so does the number of clutches and brakes needed to control the transmission. Increasingly larger numbers of gear ratios are being demanded out of a transmission while, at the same time, it is also desired to minimize the overall package size of the transmission so the transmission will still fit into a relatively small motor vehicle. Obviously, these two goals generally work against each other. Previous attempts to solve this problem have mainly been directed at increasing the number of ratios a transmission can produce, while minimizing the number of brakes and clutches used in the transmission in order to control the axial length and other dimensions of the transmission. In addition, when considering a transmission redesign, it is also important to limit the rotational speed of the gearing components. For example, pinion gears often rotate at five to seven times the engine speed, which can lead to reduced service life of the bearings supporting the pinion gears. Generally speaking, there is considered to be a give and take between at least the number of available gear ratios, required gear rotational speeds, size and the overall reliability of the transmission.

Based on the above, there is a need in the art for a transmission which exhibits an overall short axial length, has no particular gearing component rotating at an excessive speed, and still provides a large number of gear ratios.

SUMMARY OF THE INVENTION

The present invention is directed to an automatic transmission capable of producing six forward speed ratios and one reverse ratio using a single carrier. With the single carrier, the overall length of the transmission is reduced, while the transmission still provides the desired number of gear ratios.

More specifically, the automatic transmission according to the present invention includes an input shaft adapted to be driven by an engine, and an output shaft. A first planetary gearset has a first sun gear, a first ring gear, a common carrier, a first planet pinion set rotatably supported on the common carrier and drivingly engaged with the first sun gear, and a first composite gear that acts both as the first ring gear and a second sun gear. A second planetary gearset has a second ring gear, a second planet pinion set rotatably supported on the common carrier and drivingly engaged with the first composite gear, and a second composite gear that acts both as a second ring gear and a third ring gear. A third planetary gearset has a third sun gear and a third planet pinion set rotatably supported on the common carrier and drivingly engaged with the third sun gear and the second composite gear. A first brake is arranged for holding against rotation and releasing the common carrier, with the first brake preferably being a one-way brake. A second brake selectively holds against rotation the first or second composite gear to engage the second or the sixth gear ratio. A third brake holds against rotation the first or third sun gear to engage the third or fifth gear ratio.

A series of nested clutches is alternately, driveably connected or disconnected to the input shaft. A first clutch of the series of clutches alternately driveably connects or disconnects the third sun gear to the input shaft to establish the reverse gear ratio. A second clutch of the series of clutches alternately driveably connects or disconnects the first or third sun gear to the input shaft in establishing the first, second, third or fourth gear ratios. Finally, a third clutch of the series of clutches alternately driveably connects or disconnects the carrier to the input shaft in establishing the fourth, fifth or sixth gear ratios.

Additional objects, features and advantages of the present invention will become more readily apparent from the following detailed description of preferred embodiments when taken in conjunction with the drawings, wherein like reference numerals refer to corresponding parts in the several views.

BRIEF DESCRIPTION OF DRAWINGS

FIG. 3 is a chart that shows the pattern of engagement and release of the clutches, and brakes required to produce the various forward drive ratios and reverse ratio along with the torque ratios for the transmission of FIG. 1;

FIGS. 4A-4D are charts that show speeds and torques for elements, clutches and brakes of the transmission of FIG. 1;

DESCRIPTION OF PREFERRED EMBODIMENTS

Figure 1:
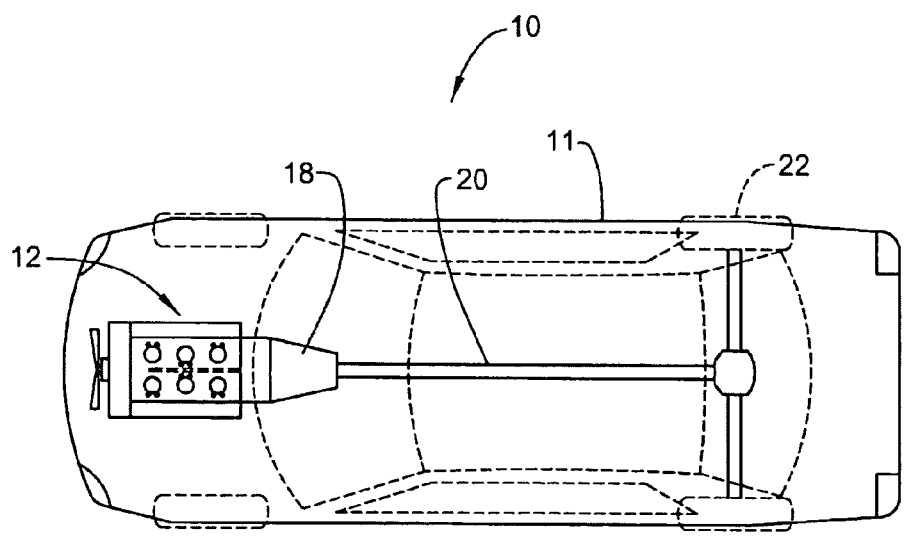
FIG. 1 is a schematic view of a vehicle incorporating a multiple-speed ratio transmission constructed in accordance with the invention.

With initial reference to FIG. 1, there is shown an automotive vehicle 10 having a body 11 and a drive source 12. Power from drive source 12 is transmitted to a transmission 18, then to the other portions of a powertrain 20 and eventually drives wheels 22. Vehicle 10 is shown as a rear wheel drive vehicle but any type of powertrain arrangement, including front wheel or all wheel drive systems, could be employed. In addition, drive source 12 is shown as an internal combustion engine, but other types of drive arrangements, including hybrid drive systems, could be utilized. Furthermore, although not shown, there is typically a clutch or hydrodynamic coupling (not shown), such as a torque converter, between drive source 12 and transmission 18.

Figure 2:
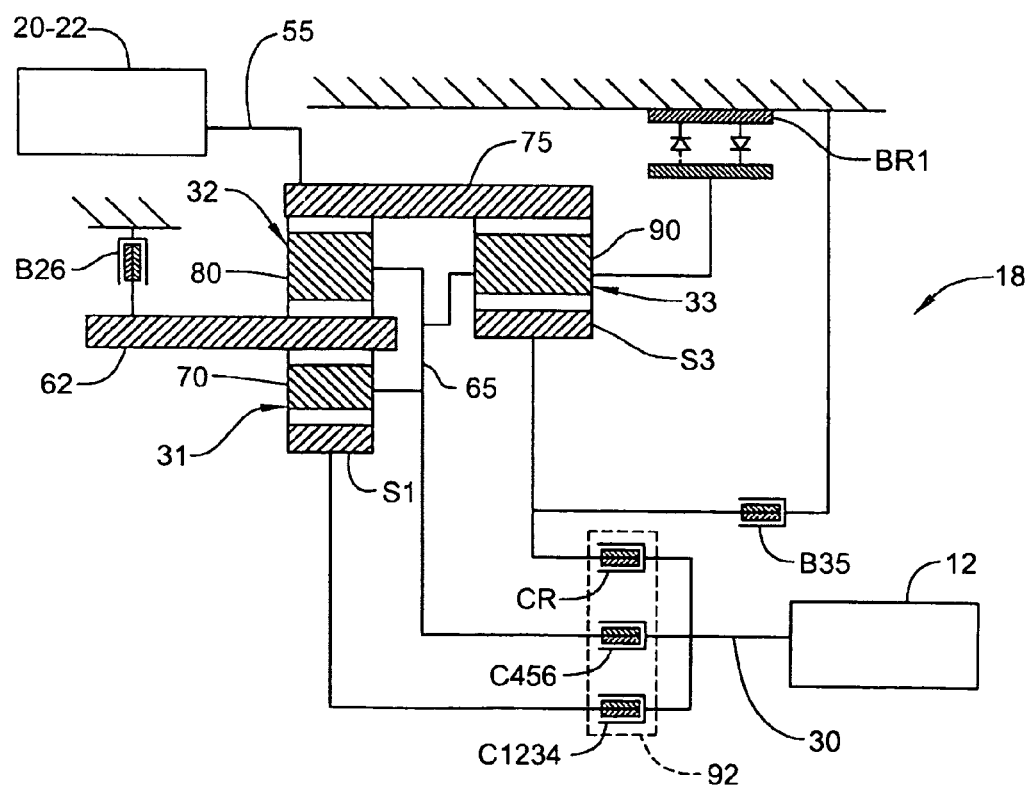
FIG. 2 is a schematic diagram of a kinematic arrangement of the gears, clutches and brakes for a first preferred embodiment of the invention.

A first preferred embodiment of transmission 18 is shown in FIG. 2 which depicts a schematic diagram of a kinematic arrangement showing several components of transmission 18. As shown, transmission 18 includes an input shaft 30 adapted to be connected to drive source 12. Transmission 18 also includes first, second and third planetary gearsets 31, 32, 33 arranged to form a compact planetary gear system by using certain common parts in the gearsets 31, 32, 33. First, second and third clutches CR, C1234, C456, along with first, second and third brakes BR1, B26, B35 are selectively actuated in groups in order to provide for six forward and one reverse gear speed ratios. Transmission 18 also has an output shaft 55 that is adapted to be connected to drive wheels 22 of vehicle 10.

First planetary gearset 31 includes a first sun gear S1 that is selectively engaged to or disengaged from input shaft 30 by second clutch C1234. A first composite gear 62 also forms part of first planetary gearset 31. First composite gear 62 is selectively braked by second brake B26 and acts both as a first ring gear for first planetary gearset 31 and as a second sun gear for second planetary gearset 32 as discussed further below. A common carrier 65, which is preferably constituted by a one-piece unit, is common to all three planetary gearsets 31, 32, 33. Common carrier 65 can be selectively braked by first brake BR1, which preferably constitutes a one-way brake. Common carrier 65 is also selectively, directly engaged to and disconnected from input shaft 30 by third clutch C456. A first planet pinion set 70 is rotatably supported on common carrier 65 and drivingly engaged with first sun gear S1 and first composite gear 62.

Second planetary gearset 32 uses first composite gear 62 as a second sun gear, a second composite gear 75 as a second ring gear and common carrier 65. Second planetary gearset 32 also includes a second planet pinion set 80 rotatably supported on common carrier 65 and drivingly engaged with first composite gear 62 and second composite gear 75. In addition to acting as the second ring gear for second planetary gearset 32, second composite gear 75 also functions as a third ring gear for third planetary gearset 33 and, in this embodiment, is connected to output shaft 55 for transmission 18.

The third planetary gearset 33 includes a third sun gear S3 which is both selectively braked by third brake B35 and is also selectively engaged to and disengaged from input shaft 30 by first clutch CR. Third planetary gearset 33 also includes a third planet pinion set 90 rotatably supported on common carrier 65 and drivingly engaged with third sun gear S3 and second composite gear 75.

As can be seen from the above discussion, first, second and third clutches CR, C1234, C456 are all connected to input shaft 30. Furthermore, first, second and third clutches CR, C1234, C456 are located in close proximity to each other. In a preferred embodiment, clutches CR, C1234, C456 are actually made from sintered metal and nested. With this arrangement, a single outer housing, schematically indicated at 92, can be used for all three clutches CR, C1234, C456, thus saving cost and space.

FIG. 3 is a chart that shows a preferred pattern of engagement and release of clutches CR, C1234, C456, as well as brakes BR1, B26, B35, used to produce six forward drive ratios and a single reverse ratio. FIG. 3 also sets forth preferred torque ratios established for transmission 18 in accordance this embodiment. In operation, a reverse gear ratio results from the simultaneous engagement of first clutch CR and first brake BR1, which connects input shaft 30 to third sun gear S3 so that torque flows through third planetary pinion gearset 33 and to second composite gear 75 and then to output shaft 55. The first speed gear ratio results from simultaneous engagement of first brake BR1 and second clutch C1234. Second clutch C1234 allows the flow of torque to pass to first sun gear S1. First brake BR1 forces common carrier 65 to stop rotating, thus affecting all three planetary gearsets 31, 32, 33. Torque therefore passes from first sun gear S1 through first and second planetary gearsets 31, 31 and then to output shaft 55.

An upshift to the second forward speed ratio results from maintaining the engagement of second clutch C1234 and starting an engagement of second brake B26, thus stopping first composite gear 62, and disengaging of first brake RB1. Torque still flows to first sun gear S1 but, since first composite gear 62 is stationary, the ratio between first sun gear S1 and second composite gear 75 changes to provide for the second forward speed ratio. Torque then passes from second composite gear 75 to output shaft 55.

An upshift to the third gear results form a disengagement of second brake B26 and an engagement of third brake B35. With second brake B26 disengaged, first composite gear 62 is free to rotate. With third brake B35 engaged, the third sun gear S3 is fixed from rotation. Torque still flows to first sun gear S1 but, since first composite gear 62 is rotatable and third sun gear S3 is not, the ratio between first sun gear S1 and second composite gear 75 changes to provide for the third forward speed ratio. Torque then passes from second composite gear 75 to output shaft 55.

An upshift to the fourth gear results from a disengagement of third brake B35 and an engagement of third clutch C456. With the disengagement of third brake B35, third sun gear S3 is free to rotate. With the engagement of third clutch C456, input shaft 30 is connected to common carrier 65, thereby simultaneously providing torque to all three planetary gearsets 31, 32, 33. With both second and third clutches C1234, C456 engaged, first sun S1 also rotates at the same speed as common carrier 65, which also forces second common gear 75 to rotate at the same speed as input shaft 30, thus providing a direct 1:1 drive.

An upshift to fifth gear, which preferably constitutes an overdrive ratio, results from disengagement of second clutch C1234 and engagement of third brake B35. With the disengagement of second clutch C1234, first sun gear S1 is free to rotate, while engagement of third brake B35 keeps third sun gear 53 stationary. The input torque still travels directly to the common carrier 65, but the input torque from input shaft 30 and the reaction torque from third sun gear S3 work to provide the fifth gear speed ratio through third planetary gearset 33.

An upshift to the sixth gear, which provides a second overdrive ratio, results from engagement of second brake B26 and disengagement of third brake B35. With the engagement of second brake B26, first common gear is held stationary and, with the disengagement of third brake B35, third sun S3 is allowed to rotate. The input torque still travels directly to common carrier 65, but the input torque from input shaft 30 and the reaction torque from common carrier 65 work to provide the sixth gear speed ratio through first and second planetary gearsets 31, 32.

As depicted in FIGS. 4A-4D, properties of the various parts of the kinematic arrangement according to the embodiment described above are shown in various tables. More specifically, various elements rotate at the speeds shown in FIG. 4A and are acted upon by the various torques shown in FIG. 4B. The clutch speeds for each of the elements are shown in FIG. 4C, while clutch torques are shown in FIG. 4D. Again, it should be understood that these operating parameters represent a preferred form of the invention described, while other ratio and other operating parameters could be established without departing from the invention.

Figure 5:
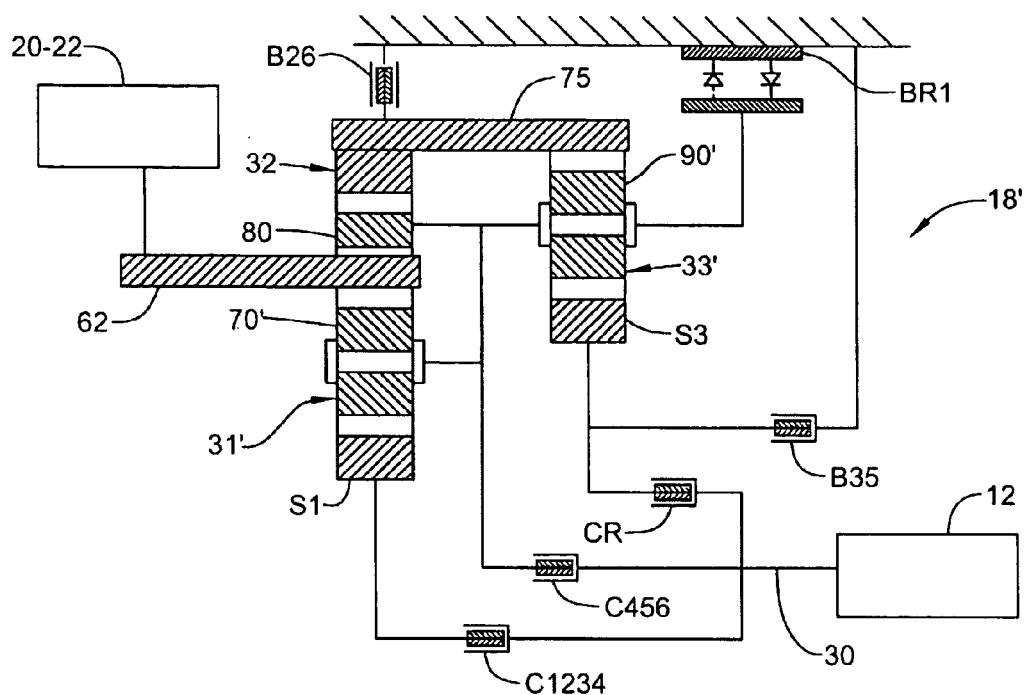
FIG. 5 is a schematic diagram of a kinematic arrangement of the gears, clutches and brakes for a second preferred embodiment of the invention.
Figure 6:
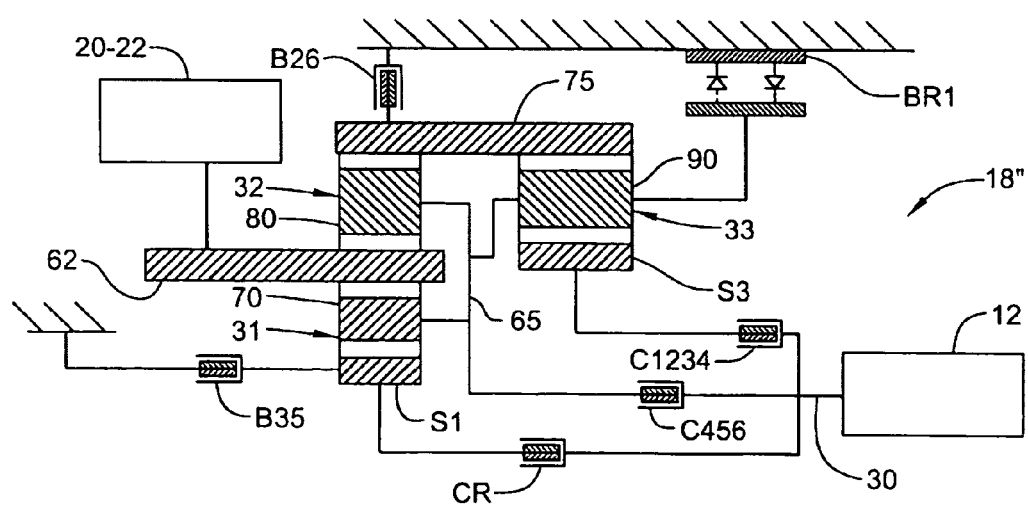
FIG. 6 is a schematic diagram of a kinematic arrangement of the gears, clutches and brakes for a third preferred embodiment of the invention.

FIGS. 5 and 6 show second and third embodiments of the invention respectively. The kinematic arrangements are substantially similar to FIG. 2 and the same parts are referenced by the same reference numerals. Each of the embodiments has common carrier 65 and the two composite gears 62, 75. Further, they operate with three brakes BR1, B26, B35 and three, preferably commonly housed, clutches CR, C1234, C456 to provide six forward and one reverse speed gear ratios. Furthermore, the same clutches CR, C1234, C456 and brakes BR1, B26, B3 are engaged in the same order to engage each of the speed ratios. However, the particular connections are different as more fully explained below.

With reference to FIG. 5, a transmission 18' according to a second preferred embodiment is shown. The difference between this embodiment and the embodiment of FIG. 2 is that second brake B26 is connected to the second composite gear 75, not first composite gear 62, while output 55 is connected to first composite gear 62, not second composite gear 75. Additionally, first planetary gearset 31' and second planetary gearset 33' are preferably formed with double planetary pinion sets 70' and double planetary sets 31' respectively. In connection with the transmission 18" of FIG. 6, the main difference between transmission 18" and transmission 15" is that in transmission 18" the third brake B35 and first clutch CR are connected to first sun gear S1 and single planetary gearsets are used.

Based on the above, it should be readily apparent that the present invention provides an automatic transmission including three planetary gearsets employing a common carrier and multiple composite gears, as well as a series of nested clutches, which collectively establish a compact transmission that effectively establishes six forward speed ratios and one reverse ratio. In addition, to advantageously having an overall short axial length, no particular gearing component of the transmission rotates at an excessive speed, even though a large number of gear ratios are available. Although described with reference to preferred embodiments of the invention, it should be understood that various changes and/or modifications can be made to the invention without departing from the spirit thereof. In general, the invention is only intended to be limited by the scope of the following claims.

The invention claimed is:

1. An automatic transmission for a vehicle comprising:
   an input shaft adapted to be driven by a source of power;
   an output shaft;
   a first planetary gearset including a first sun gear, a first composite gear defining both a first ring gear and a second sun gear, a common carrier, and a first planet pinion set rotatably supported on the common carrier and drivingly engaged with both the first sun gear and the first composite gear;
   a second planetary gearset including a second ring gear, a second planet pinion set rotatably supported on the common carrier and drivingly engaged with the first composite gear, and a second composite gear defining both a second ring gear and a third ring gear; and
   a third planetary gearset including a third sun gear, and a third planet pinion set rotatably supported on the common carrier and drivingly engaged with both the third sun gear and the second composite gear.

2. The automatic transmission of claim 1, further comprising: a first brake for selectively holding against rotation the common carrier.

3. The automatic transmission of claim 2, wherein the first brake constitutes a one-way brake.

4. The automatic transmission of claim 2, further comprising: a second brake for selectively holding against rotation one of the first composite gear or the second composite gear, wherein the automatic transmission provides for six forward and one reverse speed ratios, with the second brake being engaged to establish the second or sixth gear ratio.

5. The automatic transmission of claim 4, further comprising: a third brake for selectively holding against rotation the first or third sun gear to engage the third or fifth gear ratio.

6. The automatic transmission of claim 1, further comprising: a series of clutches alternately driveably connected or disconnected between the input and the first, second and third planetary gearsets.

7. The automatic transmission of claim 6, wherein the series of clutches include first, second and third clutches which are nested in a common housing.

8. The automatic transmission of claim 6, wherein a first clutch of said series of clutches alternately driveably connects or disconnects the third sun gear to the input to establish a reverse gear ratio.

9. The automatic transmission of claim 8, wherein a second clutch of said series of clutches alternately driveably connects or disconnects one of the first and third sun gears to the input to engage first and second gear ratios.

10. The automatic transmission of claim 9, wherein a third clutch of said series of clutches alternately driveably connects or disconnects the common carrier to the input to engage fourth, fifth and sixth gear ratios.

11. An automatic transmission for a vehicle comprising:
    an input shaft adapted to be driven by a source of power;
    an output shaft; and
    first, second and third planetary gearsets having a common carrier.

12. The automatic transmission of claim 11, wherein the first, second and third planetary gearsets further includes two composite gears.

13. The automatic transmission of claim 12, further comprising: three clutches and three brakes for establishing six forward and one reverse speed ratios.

14. A vehicle comprising:
    a body;
    a plurality of wheels supporting the body;
    a drive source mounted in the body; and
    a powertrain for transferring power from the drive source to the plurality of wheels, said powertrain including a multiple-speed ratio automatic transmission including:
      an input shaft driven by the drive source;
      an output shaft drivingly connected to the plurality of wheels;
      a first planetary gearset including a first sun gear, a first composite gear defining both a first ring gear and a second sun gear, a common carrier, and a first planet pinion set rotatably supported on the common carrier and drivingly engaged with both the first sun gear and the first composite gear;
      a second planetary gearset including a second ring gear, a second planet pinion set rotatably supported on the common carrier and drivingly engaged with the first composite gear, and a second composite gear defining both a second ring gear and a third ring gear; and
      a third planetary gearset including a third sun gear, and a third planet pinion set rotatably supported on the common carrier and drivingly engaged with both the third sun gear and the second composite gear.

15. The vehicle of claim 14, wherein the automatic transmission further comprises a first brake for selectively holding against rotation the common carrier.

16. The vehicle of claim 15, wherein the automatic transmission further comprises a second brake for selectively holding against rotation one of the first composite gear or the second composite gear, wherein the automatic transmission provides for six forward and one reverse speed ratios, with the second brake being engaged to establish the second or sixth gear ratio.

17. The vehicle of claim 16, wherein the automatic transmission further comprises a third brake for selectively holding against rotation the first or third sun gear to engage the third or fifth gear ratio.

18. The vehicle of claim 14, wherein the automatic transmission further comprises a series of clutches alternately driveably connected or disconnected between the input and the first, second and third planetary gearsets.

19. The vehicle of claim 18, wherein a first clutch of said series of clutches alternately driveably connects or disconnects the third sun gear to the input to establish a reverse gear ratio.

20. The vehicle of claim 19, wherein a second clutch of said series of clutches alternately driveably connects or disconnects one of the first and third sun gears to the input to engage first and second gear ratios.

21. The vehicle of claim 20, wherein a third clutch of said series of clutches alternately driveably connects or disconnects the common carrier to the input to engage fourth, fifth and sixth gear ratios.

* * * * *